(12) United States Patent
Dettinger et al.

(10) Patent No.: US 7,711,723 B2
(45) Date of Patent: May 4, 2010

(54) SYSTEM AND METHOD FOR MANAGING WEB APPLICATIONS

(75) Inventors: Richard D. Dettinger, Rochester, MN (US); Daniel P. Kolz, Rochester, MN (US); Fred A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/408,190

(22) Filed: Apr. 20, 2006

(65) Prior Publication Data

US 2007/0250520 A1 Oct. 25, 2007

(51) Int. Cl.
*G06F 7/00* (2006.01)
*G06F 17/30* (2006.01)

(52) U.S. Cl. .................. 707/705; 707/736; 707/755; 707/999.103

(58) Field of Classification Search .................. 707/102, 707/103
See application file for complete search history.

(56) References Cited

U.S. PATENT DOCUMENTS

| | | | |
|---|---|---|---|
| 5,964,834 A * | 10/1999 | Crutcher | 709/213 |
| 6,944,821 B1 * | 9/2005 | Bates et al. | 715/209 |
| 6,996,558 B2 | 2/2006 | Dettinger et al. | |
| 2004/0181679 A1 * | 9/2004 | Dettinger et al. | 713/193 |
| 2007/0061747 A1 * | 3/2007 | Hahn et al. | 715/764 |
| 2007/0061752 A1 * | 3/2007 | Cory | 715/804 |

\* cited by examiner

*Primary Examiner*—Mohammad Ali
*Assistant Examiner*—Angelica Ruiz
(74) *Attorney, Agent, or Firm*—Patterson & Sheridan, LLP

(57) ABSTRACT

A method, system and article of manufacture for processing requests in web applications and, more particularly, for processing requests between two different applications. One embodiment provides a computer-implemented method of processing a copy request in a distributed environment including at least a first and a second application. The method comprises receiving, from the first application, a copy request for a copy of a selected object. A fully defined instance of the selected object resides in the second application and only a representation of the fully defined instance resides in the first application. The method further comprises generating, by the second application, an object descriptor representing the fully defined instance. At least a portion of the fully defined instance is excluded in the object descriptor. The object descriptor is transmitted from the second to the first application. Thereby, access by the first application to the fully defined instance is prevented.

10 Claims, 6 Drawing Sheets

SYSTEM AND METHOD FOR MANAGING WEB APPLICATIONS

CROSS-RELATED APPLICATION

This application is related to the following commonly owned US Patent: U.S Pat. No. 6,996,558, issued Feb. 7, 2006, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to managing web applications and, more particularly, to processing requests in web applications.

2. Description of the Related Art

Generally, a distributed computer system comprises a collection of loosely coupled machines (mainframe, workstations or personal computers) interconnected by a communication network. Through a distributed computer system, a client may access various servers to store information, print documents, access databases, acquire client/server computing or gain access to the Internet. These services often require software applications running on the client's desktop to interact with other applications that might reside on one or more remote server machines. Thus, in a client/server computing environment, one or more clients and one or more servers, along with the operating system and various interprocess communication (IPC) methods or mechanisms, form a composite that permits distributed computation, analysis and presentation.

Distributed systems are often implemented with web applications. Using a web application one or more server side objects, such as pages from the server computer, can be provided to the client computer. Such pages can be displayed in a graphical user interface on the client computer using one or more windows managed by standard software such as a web browser. Each page typically includes data such as text, images, audio, or the like. A page may also include one or more items for accepting input from a user, a small amount of source code, and/or a link, each of which may generate a request when operated by the user. The request can be sent to the server computer for processing, and the server computer can communicate a response to the client computer when processing is complete. The response may include one or more additional pages that are to be displayed on the client computer.

One type of functionality that web applications may need to support is copy/cut and paste processing. For instance, a user may want to copy an object from and/or paste an object to a web application in order to share the object with other users. However, there are several constraints on copy and paste operations in web applications. By way of example, assume a user who uses a client computer to issue a copy request in a web application for a server-side object that is stored on a corresponding server computer. In this case, the entire server-side object can be rendered on the server computer as an object that is consumable by the user, such as a XML or text object.

The consumable object can be transmitted to and stored in a clipboard of the user's client computer, allowing the user to paste it anywhere, including back into the server-side web application or into other applications. However, by rendering the entire server-side object, the consumable object may expose sensitive or internal implementation details of the server-side object. On the other hand, if the entire server-side object is not rendered (on the client computer) in order to protect the sensitive and/or internal implementation details, recreating the server-side object on the server computer can be difficult or even impossible. More specifically, as a result of the user performing a paste operation back into the web application, recreation of the server-side object on the server computer on the basis of the consumable object is requested. However, as the consumable object does not include the sensitive and/or internal implementation details, these details of the server-side object can be lost during the recreation.

Therefore, there is a need for an efficient technique for processing copy and paste requests in web applications.

SUMMARY OF THE INVENTION

The present invention generally is directed to a method, system and article of manufacture for processing requests in web applications and, more particularly, for processing requests between at least a first and a second application.

One embodiment provides a computer-implemented method of processing a copy request in a distributed environment including at least a first and a second application. The method comprises receiving, from the first application, a copy request for a copy of a selected object. A fully defined instance of the selected object resides in the second application and only a representation of the fully defined instance of the selected object resides in the first application. The method further comprises generating, by the second application, an object descriptor representing the fully defined instance of the selected object. At least a portion of the fully defined instance of the selected object is excluded in the object descriptor. The object descriptor is transmitted from the second application to the first application. Thereby, access by the first application to the fully defined instance of the selected object is prevented.

Another embodiment provides a computer-implemented method of processing a paste request in a distributed environment including at least a first and a second application. The method comprises receiving, from the first application, a paste request requesting that a selected object be pasted from the second application to the first application. The paste request includes an object descriptor suitable to identify a fully defined instance of the selected object that resides in the second application. The method further comprises creating a duplicate of the fully defined instance of the selected object. Then, an output definition is returned for display by the first application. The output definition includes a representation of the duplicate but excludes at least a portion of the fully defined instance of the selected object.

Still another embodiment provides a computer-readable medium containing a program which, when executed by a processor, performs operations for processing a copy request in a distributed environment including at least a first and a second application. The operations comprise receiving, from the first application, a copy request for a copy of a selected object. A fully defined instance of the selected object resides in the second application and only a representation of the fully defined instance of the selected object resides in the first application. The operations further comprise generating, by the second application, an object descriptor representing the fully defined instance of the selected object. At least a portion of the fully defined instance of the selected object is excluded in the object descriptor. The object descriptor is transmitted from the second application to the first application. Thereby, access by the first application to the fully defined instance of the selected object is prevented.

Still another embodiment provides a computer-readable medium containing a program which, when executed by a processor, performs operations for processing a paste request in a distributed environment including at least a first and a second application. The operations comprise receiving, from the first application, a paste request requesting that a selected object be pasted from the second application to the first application. The paste request includes an object descriptor suitable to identify a fully defined instance of the selected object that resides in the second application. The operations further comprise creating a duplicate of the fully defined instance of the selected object. Then, an output definition is returned for display by the first application. The output definition includes a representation of the duplicate but excludes at least a portion of the fully defined instance of the selected object.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
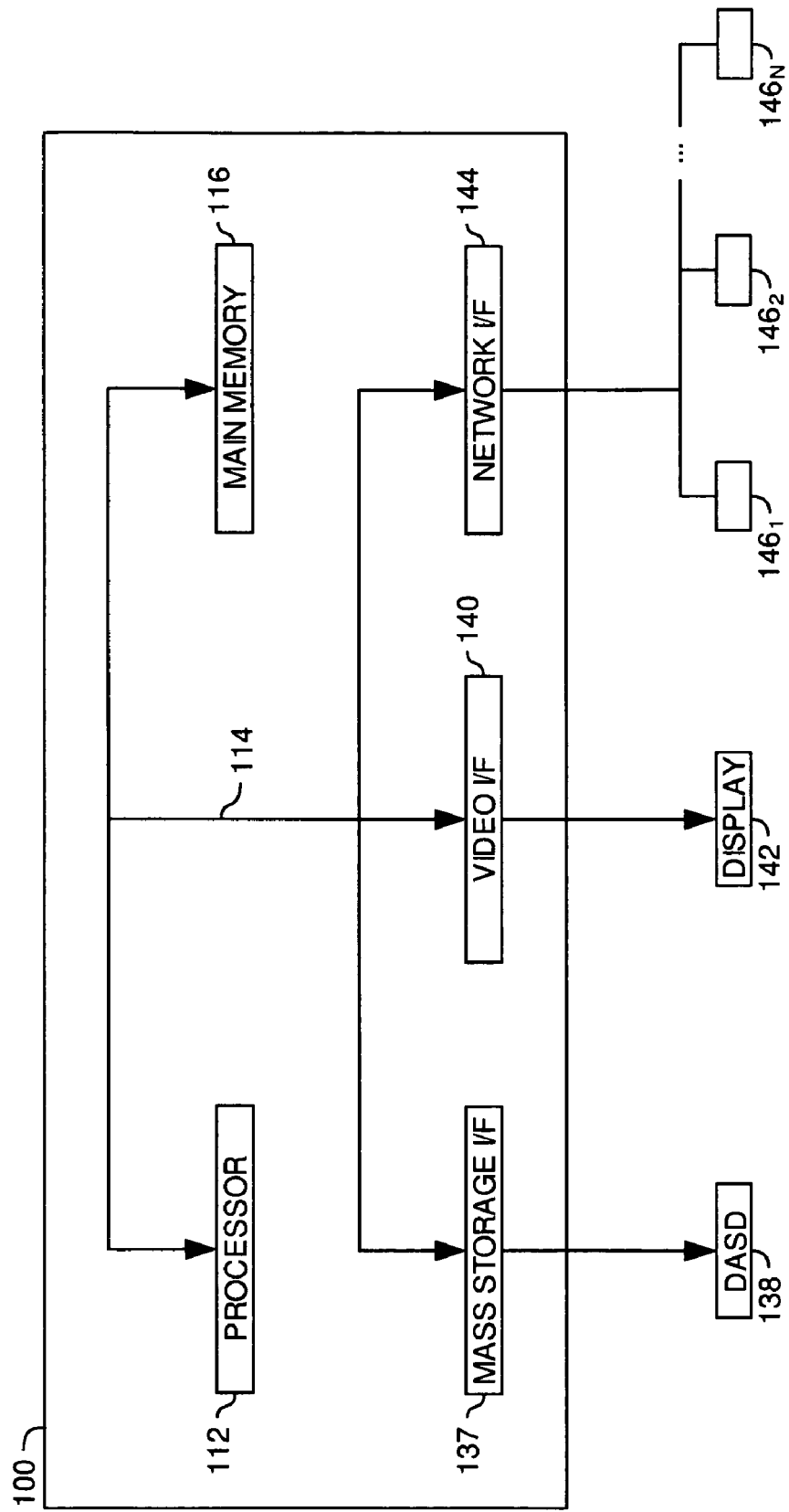
FIG. 1 is one embodiment of a computer system utilized in accordance with the invention.

The present invention is generally directed to a method, system and article of manufacture for processing requests between different applications. According to one aspect, such requests include copy/cut and paste requests issued from a first to a second application. The first and second applications can be resident on a single computer or on different computers, e.g., in a distributed environment.

In one embodiment, a user who interacts with a first application using a suitable user interface selects an object from the first application and requests a copy of the selected object. However, according to one aspect only a user-selectable representation of the selected object resides in the first application. A fully defined instance of the selected object resides only in an associated second application. Thus, in order to obtain the requested copy of the selected object the first application issues a copy request for a copy of the selected object to the second application. The second application receives the copy request and generates an object descriptor representing the fully defined instance of the selected object. In order to prevent access by the first application to the fully defined instance, at least a portion of the fully defined instance is excluded in the object descriptor. The object descriptor is then transmitted from the second application to the first application.

In one embodiment, the user then uses the user interface to request that the selected object be pasted from the second application to the first application. To this end, the first application issues a corresponding paste request to the second application. The paste request includes the object descriptor that represents the fully defined instance of the selected object. The second application receives the paste request and identifies the fully defined instance of the selected object that resides in the second application using the object descriptor. The second application then creates a duplicate of the fully defined instance and returns an output definition for display by the first application. The output definition includes a representation of the duplicate but excludes at least a part of the information included with the fully defined instance. Accordingly, the first application cannot access sensitive information and implementation details of the fully defined object which are, thus, protected against unauthorized access and misuse.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have nonvolatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Request Processing Environment

Figure 2A:
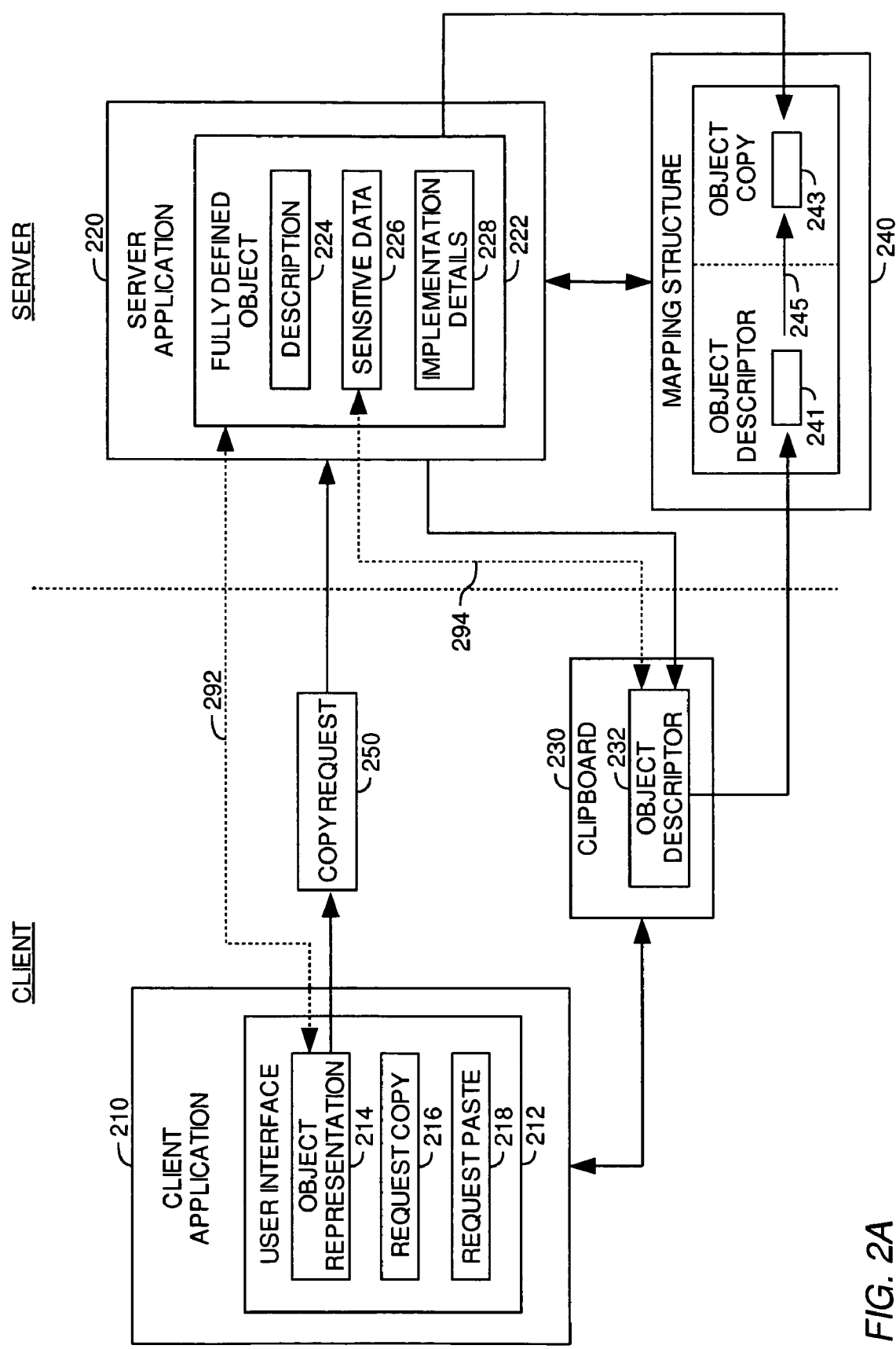
FIGS. 2A-B are relational views of software components of one embodiment of the invention.
Figure 2B:
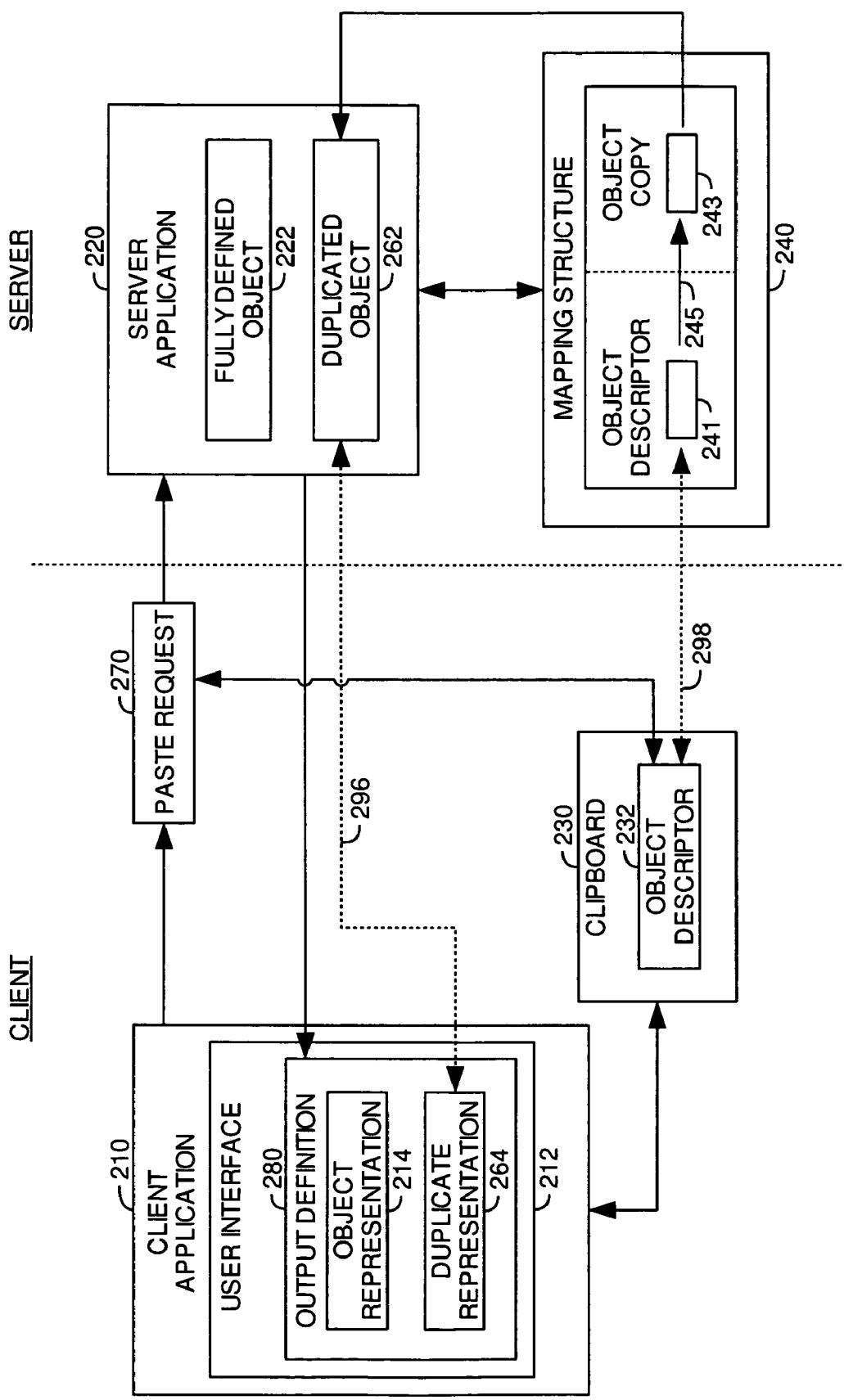

Referring now to FIGS. 2A-B, relational views of software components used to implement aspects of the invention are illustrated. The software components illustratively include a client application 210 having an associated clipboard 230 and a server application 220 having an associated mapping structure 240. The client application 210 and the server application 220 can be resident on a single computer (e.g., computer 100 of FIG. 1), or on different computers (e.g., computer 100 and one of networked devices 146 of FIG. 1), which can be arranged in a distributed environment. All such different implementations are broadly contemplated.

In one embodiment, at least the client application 210 is implemented as a web application. A web application is an application that is accessible by standard software such as a web browser and that provides some function beyond static display of information, for instance by allowing the user to query a database. Common components of a web application include HTML pages, JSP® pages, and servlets. A web application is generally stored on a server computer, and portions thereof are downloaded to a client computer each time it is executed. Thus, logical resources maintained by the web application on the server computer can be presented to a user on a client computer. However, it should be noted that embodiments of the invention are contemplated that are suitable to allow data sharing between any two different applications, including, but not limited to, web applications.

Referring now to FIG. 2A, operation of the client application 210 and the server application 220 for processing a copy or cut request 250 (hereinafter referred to as "copy request", for simplicity) in one embodiment is described. Illustratively, the copy request 250 is created on the basis of user input received from a user using a user interface 212 of the client application 210. According to one aspect, the user interface 212 is a graphical user interface. However, it should be noted that the user interface 212 can be any suitable user interface configured to receive and process user input. Accordingly, all such implementations are broadly contemplated.

In one embodiment, the user interface 212 displays one or more user-selectable representations of objects. Illustratively, the user interface 212 displays a single user-selectable representation 214 of an associated object (hereinafter referred to as "object representation", for simplicity). By way of example, the object representation 214 can be an icon, a text field associated with a checkbox or an entry in a menu. The object representation 214 resides in the client application 210, while a fully defined instance 222 of the associated object (hereinafter referred to as "fully defined object", for simplicity) resides in the server application 220. In other words, the object representation 214 is only a restricted client rendered version of the fully defined object 222.

In one embodiment, the fully defined object 222 includes an object description 224 and implementation details 228. The object description 224 includes image or text data and identifies an underlying logical resource that defines the associated object and resides in the server application 220. The implementation details 228 illustratively define how to access the underlying logical resource. Accordingly, the implementation details 228 may define a full access path or authorization rules for accessing the logical resource. The fully defined object 222 may further include sensitive data 226 that is related to the underlying logical resource or included therewith and that requires some degree of confidentiality.

Using the user interface 212, a user may select the object representation 214 and/or one or more other object representations and request a copy of the associated object(s). To this end, the user interface 212 may display an input field or a menu that allows the user to specify the request for the copy. However, the user interface 212 may also provide other means that are suitable to allow user specification of the request. Illustratively, the user interface 212 displays a pushbutton 216 that the user may click to initiate a copy operation. Accordingly, all such implementations are broadly contemplated.

In response to the user selecting the object representation 214 and clicking the pushbutton 216, the client application 210 creates and issues the copy request 250 to the server application 220 to launch the copy operation. The server application 220 receives the copy request 250 and retrieves the fully defined object 222 that corresponds to the object representation 214, as indicated by a dashed arrow 292. The server application 220 then creates an object descriptor 232 representing the fully defined object 222, as indicated by a dashed arrow 294. However, in one embodiment at least a portion of the fully defined object 222 is excluded in the object descriptor 232 in order to prevent access by the client application 210 to the fully defined object 222. For instance, the sensitive data 226 and the implementation details 228 are excluded in the object descriptor 232. Thus, the sensitive data 226 and the implementation details 228 can be protected from unauthorized and undesired access by the client application 210.

As was noted above, in one embodiment the copy request 250 is implemented as a cut request that requests to cut the fully defined object 222 in the server application 220. In this case, the fully defined object 220 is removed from the server application 220 after creation of the object descriptor 232.

In one embodiment, the server application 220 maintains the mapping structure 240 in order to map generated object descriptors to corresponding fully defined objects. The mapping structure 240 can be implemented as an integral part of the server application 220 or as a separate component configured to achieve aspects of the invention. All such implementations are broadly contemplated.

Illustratively, the mapping structure 240 includes mappings of a plurality of object descriptors to corresponding fully defined objects. In the illustrated example, the server application 220 creates an object descriptor copy 241 of the generated object descriptor 232 and an object copy 243 of the fully defined object 222 and stores both copies in the mapping structure 240. Thereby, the object descriptor copy 241 is mapped to the object copy 243, as indicated by an arrow 245.

The object descriptor 232 is transmitted from the server application 220 to the client application 210. The client application 210 stores the received object descriptor 232 in the clipboard 230 and completes the copy operation. An exemplary method for performing a copy operation in one embodiment is described below with reference to FIG. 3.

The user may then use the user interface 212 to request for a paste of the fully defined object 222 to the client application 210. As illustrated in FIG. 2A, the user interface 212 displays a pushbutton 218 that the user may click to request for the paste operation, as described in more detail below with reference to FIG. 2B. In one embodiment, the user clicks the pushbutton 218 when the copy operation is completed to initiate the paste operation.

However, it should be noted that initiating the paste operation using the client application 210 after completion of the copy or cut operation is merely described by way of example. More generally, any application having the object descriptor 232 may initiate the paste operation. For instance, the object descriptor 232 can be used by another application, such as an e-mail application. By way of example, the user who uses the client application 210 can insert the object descriptor 232 from the clipboard 230 into an e-mail and send the e-mail to another user. The other user may then initiate the paste operation from a corresponding e-mail application. Accordingly, it should be understood that initiation of the paste operation using the client application 210 after completion of the copy operation is merely described by way of example and not to limit the invention accordingly. Instead, any possible implementations are broadly contemplated.

Referring now to FIG. 2B, an exemplary operation of the client application 210 and the server application 220 for processing a paste request 270 is described. In one embodiment, the client application 210 retrieves the object descriptor 232 and/or one or more other object descriptors from the clipboard 230 in order to create the paste request 270. More specifically, the object descriptor 232 and/or the one or more other object descriptors are included with the paste request 270 which is then transmitted to the server application 220 to launch the paste operation.

The server application 220 receives the paste request 270 and identifies the fully defined object 222 that is associated with the object descriptor 232 included with the paste request 270. To this end, the server application 220 accesses the mapping structure 240 in one embodiment to retrieve the object descriptor copy 241 that matches the object descriptor 232. Thus, using the mapping indicated by the arrow 245, the object copy 243 that matches the fully defined object 222 can be retrieved from the mapping structure 240. Using the object copy 243, the server application 220 creates a duplicate 262 of the fully defined object 222 (hereinafter referred to as "duplicated object", for simplicity). Accordingly, the duplicated object 262 includes the same information as the fully defined object 222 illustrated in FIG. 2A.

In an alternative embodiment, the server application 220 does not maintain the mapping structure 240 and instead creates the duplicated object 262 on the basis of the object descriptor 232. To this end, the server application 220 derives required parameters from the object descriptor 232 that can be used as settings for the duplicated object 262, as described in more detail below with reference to FIG. 4B.

The server application 220 then creates an output definition 280 for display by the client application 210. In one embodiment, the output definition 280 includes a representation 264 of the duplicate (hereinafter referred to as "duplicate representation", for simplicity) that excludes a part of the information included with the duplicated object 262. For instance, the sensitive data 226 and the implementation details 228 can be excluded in the duplicate representation 264 so that the client application 210 cannot access the duplicated object 262 or the fully defined object 222. Furthermore, the output definition 280 defines how the duplicate representation 264 is displayed in the user interface 212. By way of example, the output definition 280 is a web page having one or more user-selectable elements, one of which being the duplicate representation 264.

The user interface 212 displays the output definition 280 when the paste operation is completed and, thus, displays the object representation 214 and the duplicate representation 264. An exemplary method for performing a paste operation in one embodiment is described below with reference to FIGS. 4A-B.

Performing a Copy or Cut Operation

Figure 3:
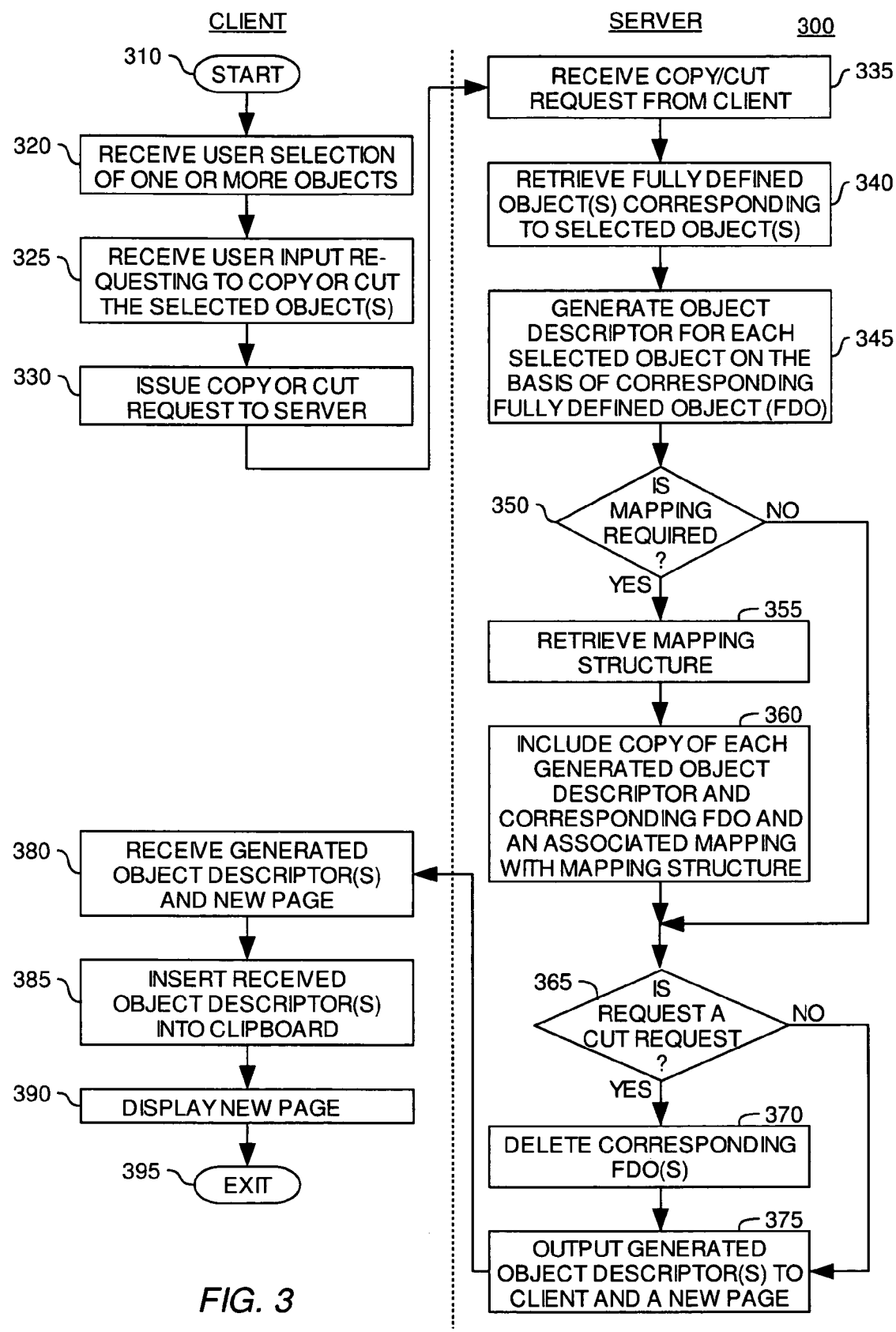
FIG. 3 is a flow chart illustrating a method of processing a copy/cut request in one embodiment.

Referring now to FIG. 3, one embodiment of a method 300 for processing a copy or cut request (e.g., copy request 250 of FIG. 2A) is illustrated. According to one aspect, the copy or cut request is issued from a first application (e.g., client application 210 of FIG. 2A) to a second application (e.g., server application 220 of FIG. 2A). At least several steps of the method 300 can be performed on the basis of user input received via a suitable user interface (e.g., user interface 212 of FIG. 2A) of the first application. Method 300 starts at step 310.

At step 320, the first application receives user input specifying one or more selected objects. In one embodiment, a user selects an object representation (e.g., object representation 214 of FIG. 2A) displayed in the user interface of the first application. The object representation is associated with a fully defined object (e.g., fully defined object 222 of FIG. 2A) that resides in the second application.

For instance, assume that the first application is a client-side web application that is configured for query building. To this end, the user interface displays in one embodiment a first web page that is configured to allow user specification of an abstract query. An abstract query is a query that is created using an abstraction model that hides some of the complexities of the physical layout of an underlying database from the user. The abstraction model may include logical fields with recognizable names that map to corresponding physical fields of the underlying database. Thus, "abstract" queries may be generated containing abstract query conditions based on the logical fields. Upon issuance, the logical fields of an abstract query may be mapped to corresponding physical fields to create a physical or "concrete" query. For some applications, abstract queries may be saved, allowing subsequent users to reuse the saved abstract queries without having to generate their own. The concepts of data abstraction and abstract queries are described in detail in the commonly owned, co-pending application Ser. No. 10/083,075, entitled "APPLICATION PORTABILITY AND EXTENSIBILITY THROUGH DATABASE SCHEMA AND QUERY ABSTRACTION", filed Feb. 26, 2002, which is incorporated herein by reference in its entirety.

Assume now that the first web page displayed by the user interface includes a representation of an abstract query condition that defines the object representation. The abstract query condition itself resides in the second application that is a server-side web application configured for query processing and that maintains logical resources such as the abstract query condition required for the query building. Assume further that the abstract query condition is configured to limit an associated abstract query to data records for patients in a hospital that have a Cholera ICD-9 diagnosis with a probability of at least 90%. Accordingly, in the given example the underlying abstract query condition that defines the fully defined object is:

"Condition: Percent: "data://Diagnosis/ICD9//Cholera@Certainty">=90"

and the displayed object representation that was selected by the user is "Certainty greater or equal than 90".

It should be noted that the illustrated underlying abstract query condition is an oversimplified example of a fully defined object. More specifically, in embodiments of the invention the fully defined object may contain other objects and may be a highly complex, binary object that is used by the second application. In other words, the fully defined object generally includes a substantial amount of additional information that is not exposed in its entirety in the displayed object representation. However, in order to simplify understanding of the invention and to avoid obscuring the underlying inventive idea, the example described above is used here.

At step 325, the first application receives user input requesting to copy or cut the underlying abstract query condition that is represented by the selected object representation. For instance, the user clicks a corresponding pushbutton (e.g., pushbutton 216 of FIG. 2A) displayed in the first web page to initiate the copy or cut operation. At step 330, the first application creates a corresponding copy or cut request (e.g., copy request 250 of FIG. 2A) that is transmitted to the second application to launch the copy or cut operation.

At step 335, the second application receives the transmitted copy or cut request from the first application and retrieves the underlying abstract query condition that corresponds to the selected object representation at step 340. At step 345, the second application generates an object descriptor (e.g., object descriptor 232 of FIG. 2A) for the underlying abstract query condition. In the given example, assume that the second application generates the object descriptor:

"Cholera Diagnosis Certainty>=90".

It should be noted that the object descriptor in the given example includes more information than the displayed object representation. As the abstract query of the user is directed towards patients having a Cholera ICD-9 diagnosis with a probability of at least 90%, the displayed object representation is sufficiently significant to the user who is aware of the query context. However, in order to allow use of the object descriptor in a subsequent paste operation that is performed in another context, the second application needs to be able to identify the underlying abstract query condition unambiguously using the object descriptor. For instance, assume that the user includes the object descriptor with an e-mail to another user. Assume further that the other user displays the e-mail in a corresponding e-mail application. If the e-mail application only displays the object representation "Certainty greater or equal than 90", the other user may not be able to identify unambiguously which certainty is meant. Furthermore, if the second application maintains multiple "Certainty" fields each related to a different diagnosis, such as:

"/Diagnosis/ICD9/Cholera@Certainty"

"/Diagnosis/ICD9/AIDS@Certainty", and

"/Test/Blood Test/Pregnancy@Certainty", the second application may not be able to perform a requested paste operation as the context required for identification of the accurate Certainty field is missing. Therefore, the object descriptor includes some context information derived from the underlying abstract query condition that also conveys meaningful information to the user, i.e., "Cholera Diagnosis".

However, it should be noted that the object descriptor nevertheless excludes part of the information included with the underlying abstract query condition. More specifically, in the given example implementation details (e.g., implementation details 228 of FIG. 2A) defining the access path required in an underlying computer system (e.g., computer system 100) are excluded from the object descriptor. Accordingly, these implementation details are hidden from the user who uses the object descriptor. Thus, the user can be prevented from accessing the underlying abstract query condition without an explicit authorization.

At step 350, the second application determines whether object mapping is required. If object mapping is not required, processing proceeds with step 365. Otherwise processing proceeds with step 355.

At step 355, the second application retrieves an associated mapping structure (e.g., mapping structure 240 of FIG. 2A). If the mapping structure does not exist, the second application may either create the mapping structure or return an error message to the first application.

At step 360, the second application generates a copy of the generated object descriptor (e.g., object descriptor copy 241 of FIG. 2A) and the underlying abstract query condition (e.g., object copy 243 of FIG. 2A). Then, the second application inserts both copies and a mapping of the copies to each other into the retrieved mapping structure.

At step 365, the second application determines whether the copy or cut request is a cut request. If the request is a cut request, the underlying abstract query condition is removed from the second application at step 370. Otherwise, processing proceeds with step 375. At step 375, the generated object descriptor is transmitted to the first application.

In one embodiment, the generated object descriptor is transmitted to the first application together with a second web page that essentially corresponds to the first web page. However, if the request issued from the first application is a cut request, the object representation of the underlying abstract query condition in the first web page needs to be removed from display. Accordingly, the object representation is no longer displayed in the second web page. If, however, the request is a copy request, it may be desirable to render a user-selectable element (e.g., pushbutton 216 of FIG. 2A) configured to allow the user to initiate a copy operation unavailable. In this case, the second web page may still display, but no longer allow selection of, the user-selectable element. Alternatively, in the case of a copy operation, the second web page may be defined by the first web page in order to allow the user selection of one or more other object representations for copying or cutting. All such implementations are broadly contemplated.

At step 380, the first application receives the generated object descriptor and the second web page. At step 385, the received object descriptor is inserted into a clipboard (e.g., clipboard 232 of FIG. 2A) of the first application. At step 390, the second web page is displayed in the user interface of the first application. Processing then exits at step 395.

Performing a Paste Operation

Figure 4A:
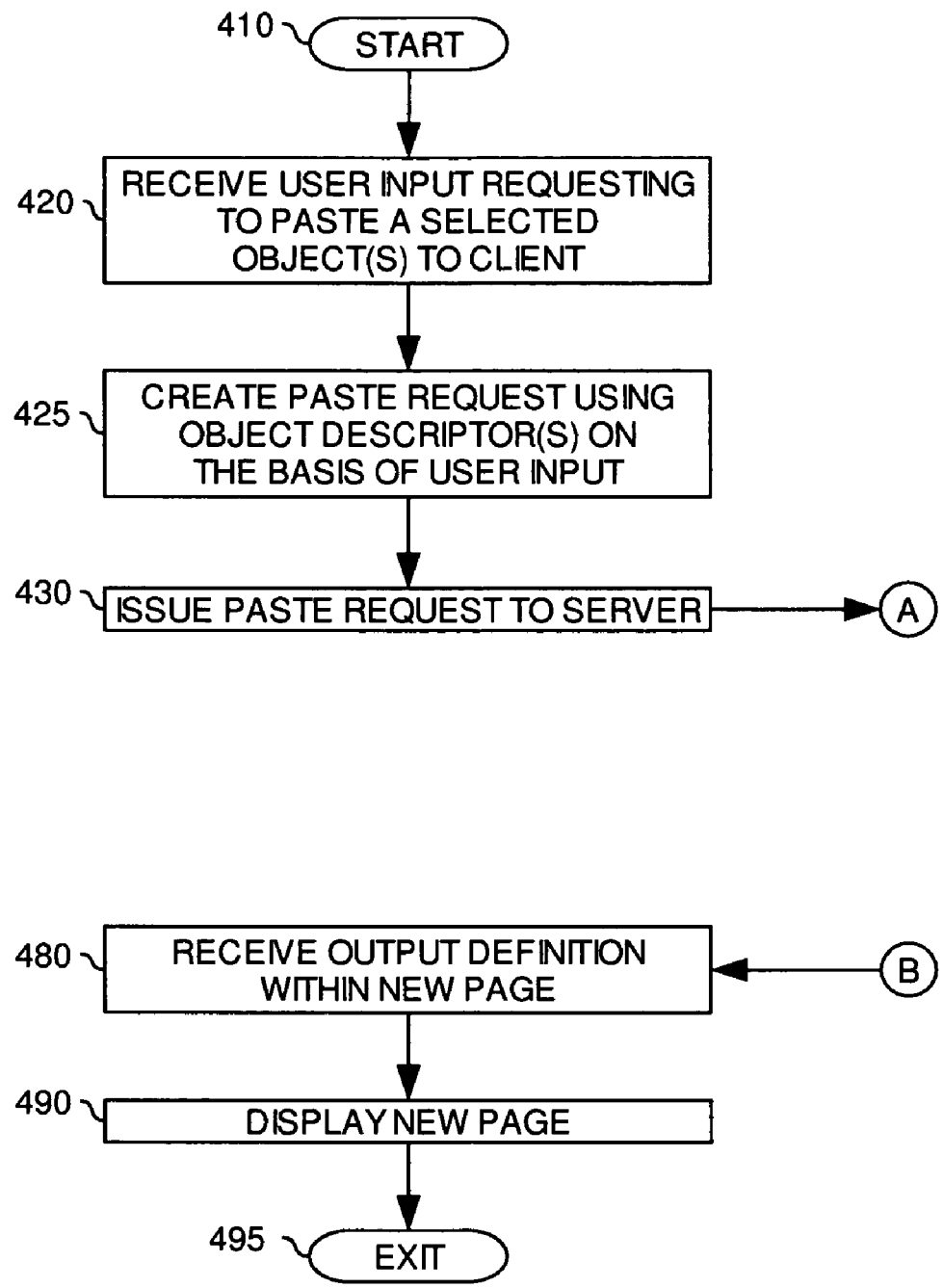
FIGS. 4A-B are flow charts illustrating a method of processing a paste request in one embodiment.
Figure 4B:
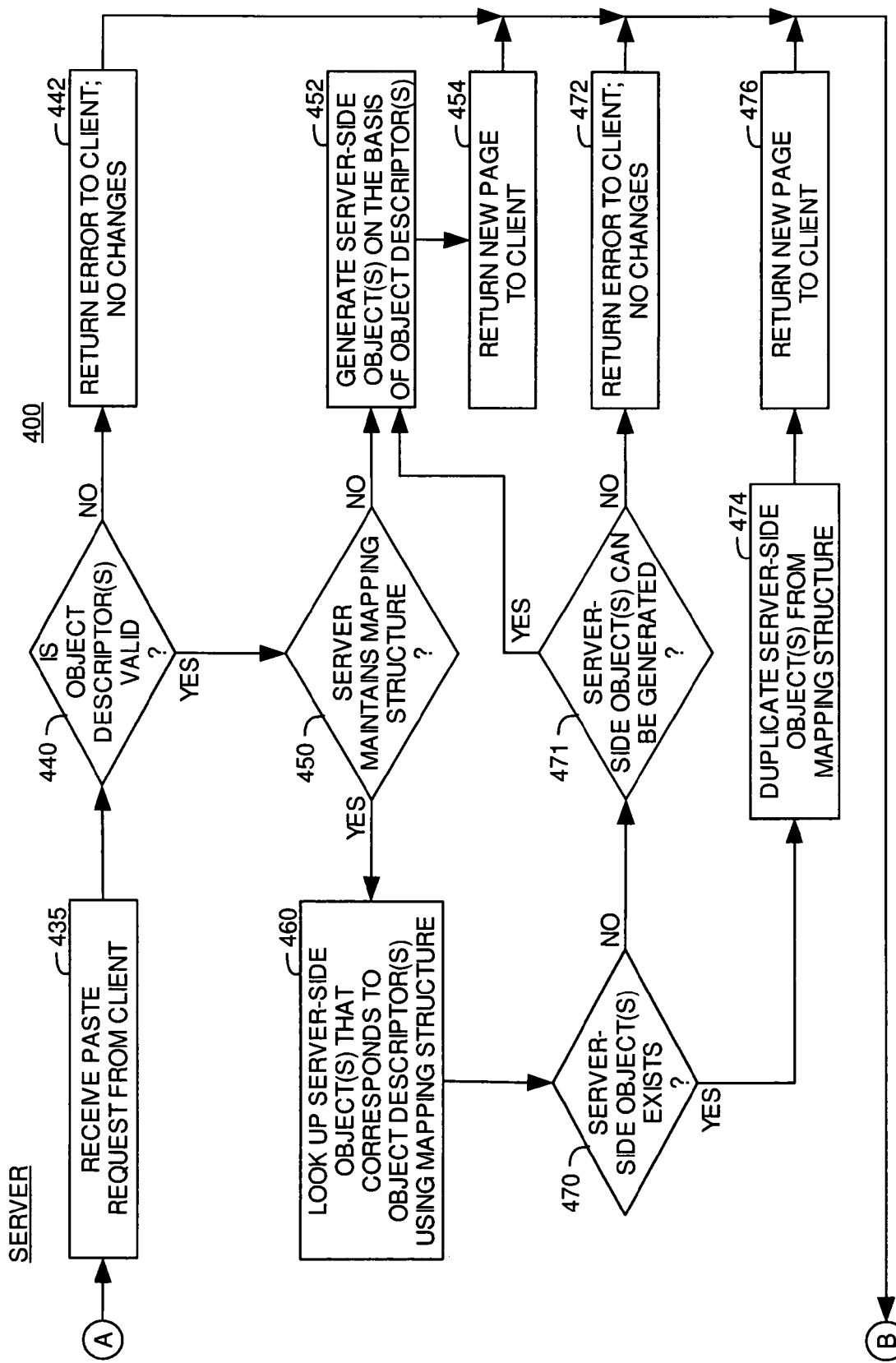

Referring now to FIGS. 4A-B, one embodiment of a method 400 for processing a paste request (e.g., paste request 270 of FIG. 2B) is illustrated. According to one aspect, the paste request is issued from a first application (e.g., client application 210 of FIG. 2B) to a second application (e.g., server application 220 of FIG. 2B). At least several steps of the method 400 can be performed on the basis of user input received via a suitable user interface (e.g., user interface 212 of FIG. 2A) of the first application.

In one embodiment, the method 400 is entered after completion of the method 300 of FIG. 3. More specifically, the user who initiated the copy or cut operation according to method 300 of FIG. 3 may subsequently initiate a paste operation with respect to the underlying abstract query condition that was previously copied or cut. However, as was noted above the user may also transmit the object descriptor that was inserted into the clipboard of the first application at step 385 of FIG. 3 to another user using a third application. In this case, the other user may also initiate the paste operation. All such implementations are broadly contemplated. However, for simplicity it is assumed that in the given example the user who initiated the copy operation as described above with reference to FIG. 3 subsequently initiates the paste operation.

Method 400 starts at step 410. At step 420, the first application receives user input requesting to paste the underlying abstract query condition to the first application. For instance, the user clicks a corresponding pushbutton (e.g., pushbutton 218 of FIG. 2B) displayed in the second web page to initiate the paste operation. At step 425, the first application creates a corresponding paste request (e.g., paste request 270 of FIG. 2B) that includes the object descriptor which was stored in the clipboard of the first application at step 385 of FIG. 3. At step 430, the paste request is transmitted to the second application to launch the paste operation.

At step 435, the second application receives the transmitted paste request from the first application and extracts the object descriptor therefrom. At step 440, the second application determines whether the extracted object descriptor is valid. In one embodiment, determining whether the extracted object descriptor is valid includes determining whether the syntax of the extracted object descriptor is valid. For instance, as was noted above, the extracted object descriptor in the given example has the syntax "Cholera Diagnosis Certainty>=90" which is assumed to be the only valid syntax. Thus, a descriptor having by way of example the syntax "Certainty of Cholera Diagnosis>=90" can be recognized as a non-valid object descriptor. In one embodiment, determining whether the extracted object descriptor is valid includes determining whether a mapping structure (e.g., mapping structure 240 of FIG. 2B) of the second application includes an object descriptor copy (e.g., copy 241 of FIG. 2B) that matches the extracted object descriptor. Step 440 includes authorization verification to determine whether the user who initiated the paste operation is authorized to access system resources or objects required to create a duplicated object (e.g., duplicated object 262 of FIG. 2B) as a result of the paste operation. All such implementations are broadly contemplated.

If the extracted object descriptor is valid, processing proceeds with step 450. Otherwise, the paste operation is not performed and an error message is generated by the second application at step 442. In one embodiment, the error message is included with a new web page transmitted to the first application. More specifically, as the paste operation is not performed and no duplicated object is created, the new web page can be defined by the first web page that additionally displays the error message. Processing then proceeds with step 480.

At step 450, it is determined whether the second application maintains a mapping structure (e.g., mapping structure 240 of FIG. 2B). If so, the second application accesses the mapping structure at step 460. Otherwise, the second application generates an abstract condition (e.g., duplicated object 262 of FIG. 2B) on the basis of the extracted object descriptor that can be used as a duplicate of the underlying abstract query condition. To this end, the second application identifies parameters from the extracted object descriptor that can be used as settings for the abstract condition. In the given example, the second application identifies "Certainty" as name of the condition field, and "Cholera" and "Diagnosis" as parameters that identify a valid access path to the "Certainty" field. ">=" is identified as a comparison operator and "90" as a comparison value. Assuming that in the given example only a single "Certainty" field relates to Cholera diagnosis, the second application generates the abstract condition:

"Condition: Percent: "data://Diagnosis/ICD9/Cholera@Certainty">=90"".

It should be noted that the generated abstract condition exactly matches the underlying abstract query condition in the given example. In other words, it is assumed that the extracted object descriptor includes all information required to generate the abstract condition. However, in embodiments of the invention it may not be possible to generate an abstract condition that matches the underlying abstract query condition on the basis of the extracted object descriptor. In this case, the paste operation cannot be completed and processing proceeds with step 442. Otherwise, processing proceeds with step 454.

At step 454, the second application generates a new web page (e.g., output definition 280 of FIG. 2B) for display by the first application. In one embodiment, the new web page includes a representation of the generated abstract condition (e.g., duplicate representation of FIG. 2B). Illustratively, the representation:

"Certainty>=90"

is included with the new web page. Processing then proceeds with step 480.

At step 460, the second application accesses the mapping structure to identify an object descriptor copy (e.g., copy 241 of FIG. 2B) that matches the extracted object descriptor. Furthermore, a mapping (e.g., mapping 245 of FIG. 2B) of the identified object descriptor copy to a copy of the underlying abstract query condition (e.g., copy 243 of FIG. 2B) is identified.

At step 470, it is determined whether a valid copy of the underlying abstract query condition is included with the mapping structure. If so, the copy is retrieved and processing proceeds with step 474. Otherwise, it is determined at step 471 whether the abstract condition can be generated as described above with reference to step 452. If so, processing returns to step 452 where the abstract condition is generated on the basis of the extracted object descriptor. Otherwise, the paste operation is not performed and an error message is generated at step 472. Processing then proceeds with step 480. Step 472 corresponds to step 442 described above and is therefore not explained in more detail.

At step 474, the second application duplicates the retrieved copy of the underlying abstract query condition. Then, at step 476 the second application generates a new page (e.g., output definition 280 of FIG. 2B) for display by the first application. In one embodiment, the new web page includes a representation of the duplicated abstract query condition (e.g., duplicate representation of FIG. 2B). Illustratively, the representation:

"Certainty>=90"

is included with the new web page. Processing then proceeds with step 480.

As was noted above, the representation of the duplicated abstract query condition in the new web page excludes at least a part of the information included with the generated abstract condition or the duplicated abstract query condition. In other words, the first application cannot obtain a complete copy of the fully defined abstract query condition (e.g., fully defined object 222 of FIG. 2B) according to embodiments of the invention, but only a restricted version thereof. Thus, the user cannot access directly the generated abstract condition, the duplicated abstract query condition and/or the abstract query condition itself, nor create duplicates thereof without explicit validation and authorization of the object descriptor at step 440.

At step 480, the first application receives the new web page. At step 490, the new web page is displayed in the user interface of the first application. Processing then exits at step 495.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing a copy request in a distributed environment including at least a first application executing on a first computing system and a second application executing on a second computing system, the method comprising:
   receiving, over a network connection, from the first application, a copy request for a copy of a selected object, wherein a fully defined instance of the selected object resides in the second application and only a representation of the fully defined instance of the selected object resides in the first application;
   generating, by the second application, an object descriptor representing the fully defined instance of the selected object, wherein at least a portion of the fully defined instance of the selected object is excluded in the object descriptor;
   generating by the second application, a mapping from the object descriptor to the fully defined instance of the selected object, wherein the mapping allows the second application to identify the fully defined instance of the selected object from the descriptor;
   storing, by the second application, the mapping between the object descriptor and the fully defined instance of the object residing in the second application;
   transmitting, over the network connection, the object descriptor from the second application to the first application; whereby access by the first application to the fully defined instance of the selected object is prevented;
   receiving, over the network connection, by the first application, the object descriptor transmitted from the second application;
   storing the received object descriptor in a clipboard of the first application
   receiving, from the first application, a paste request requesting that the selected object be pasted from the second application to the first application, the paste request including the object descriptor;
   creating a duplicate of the fully defined instance of the selected object; and
   returning an output definition for display by the first application, the output definition including a representation of the duplicate but excluding a part of the information included with the fully defined instance of the selected object.

2. The method of claim 1, wherein the excluded portion of the fully defined instance of the selected object includes at least one of sensitive information and implementation details of the selected object.

3. The method of claim 1, further comprising:
   displaying a user interface of the first application allowing interaction with the first application, wherein the selected object and the copy request are specified using the user interface; and
   transmitting the copy request from the first to the second application.

4. The method of claim 1, wherein the copy request includes a request to cut the selected object from the second application, the method further comprising:
   removing the fully defined instance of the selected object from the second application.

5. The method of claim 1, further comprising, prior to creating the duplicate:
   determining whether the object descriptor is valid; and
   if the object descriptor is not valid, returning an error from the second to the first application.

6. The method of claim 1, wherein creating the duplicate comprises:
   determining whether the second application maintains a mapping structure mapping the object descriptor to the fully defined instance of the selected object;
   if so, determining whether the mapping structure includes a copy of the fully defined instance; and
   if so, generating the duplicate on the basis of the copy of the fully defined instance.

7. The method of claim 6, further comprising:
   if the mapping structure does not include a copy of the fully defined instance, returning an error from the second to the first application.

8. The method of claim 6, further comprising:
   if the second application does not maintain the mapping structure, generating the duplicate on the basis of the object descriptor.

9. The method of claim 1, further comprising:
   displaying a user interface of the first application allowing interaction with the first application, wherein the selected object and the paste request are specified using the user interface; and
   transmitting the paste request from the first to the second application.

10. The method of claim 1, wherein at least the first application is a web application.

* * * * *